US010386909B1

(12) United States Patent
Poplack et al.

(10) Patent No.: US 10,386,909 B1
(45) Date of Patent: *Aug. 20, 2019

(54) METHOD AND SYSTEM TO MITIGATE LARGE POWER LOAD STEPS DUE TO INTERMITTENT EXECUTION IN A COMPUTATION SYSTEM

(71) Applicant: CADENCE DESIGN SYSTEMS, INC., San Jose, CA (US)

(72) Inventors: Mitchell G. Poplack, San Jose, CA (US); Yuhei Hayashi, San Jose, CA (US)

(73) Assignee: Cadence Design Systems, Inc., San Jose, CA (US)

( * ) Notice: Subject to any disclaimer, the term of this patent is extended or adjusted under 35 U.S.C. 154(b) by 303 days.

This patent is subject to a terminal disclaimer.

(21) Appl. No.: 15/279,251

(22) Filed: Sep. 28, 2016

(51) Int. Cl.
   *G06F 3/00* (2006.01)
   *G06F 1/3203* (2019.01)
   *G06F 9/455* (2018.01)
   *G06F 9/30* (2018.01)
   *G06F 9/54* (2006.01)
   *G06F 17/50* (2006.01)

(52) U.S. Cl.
   CPC ........ *G06F 1/3203* (2013.01); *G06F 9/30076* (2013.01); *G06F 9/45508* (2013.01); *G06F 9/54* (2013.01); *G06F 17/5036* (2013.01)

(58) Field of Classification Search
   CPC .................................................. G06F 17/5036
   USPC ........................................................... 703/4
   See application file for complete search history.

(56) References Cited

U.S. PATENT DOCUMENTS

| 4,394,727 A | * | 7/1983 | Hoffman | ............... G06F 9/4881 718/103 |
| 2007/0255929 A1 | * | 11/2007 | Kasahara | .............. G06F 1/3203 712/1 |
| 2009/0063885 A1 | * | 3/2009 | Arimilli | ................ G06F 9/5038 713/375 |
| 2017/0024316 A1 | * | 1/2017 | Park | .......................... G06F 9/46 |

OTHER PUBLICATIONS

Chung-hsing Hsu, A Feasibility Analysis of Power Awareness in Commodity-Based High-Performance Clusters. (Year: 2006).*

* cited by examiner

*Primary Examiner* — Lechi Truong
(74) *Attorney, Agent, or Firm* — Eric L. Sophir; Dentons US LLP

(57) ABSTRACT

Disclosed herein are systems and methods to generate, by a compiling processor, one or more sets of one or more execution instructions responsive to compiling a netlist file. The method further includes storing, by the compiling processor, a set of execution instructions into an instruction memory of an execution processor. The method further includes generating, by a compiling processor, a set of one or more keephot instructions for the execution processor based upon the set of execution instructions stored into the instruction memory of the execution processor. The method further includes storing, by a compiling processor, the set of keephot instructions into the instruction memory of the execution processor.

18 Claims, 7 Drawing Sheets

500

METHOD AND SYSTEM TO MITIGATE LARGE POWER LOAD STEPS DUE TO INTERMITTENT EXECUTION IN A COMPUTATION SYSTEM

TECHNICAL FIELD

This application relates generally to power management among circuits of a computing system.

BACKGROUND

Electronic design automation (EDA) tools are used for designing, verifying, and implementing electronic systems and component circuits. Within an electronic system, hundreds of integrated circuits may be interconnected on one or more printed circuit boards (PCBs). Integrated circuits comprise an ever-increasing number of interconnected transistors to enable a set of intended functions.

In emulation systems, emulation chips may comprise hardware components, such as processors, capable of processor-based (e.g., hardware-based) emulation of logic systems, such as application specific integrated circuits (ASICs), to test their capabilities. A common method of hardware design verification is to use processor-based hardware emulators to emulate the design prior to physically manufacturing the integrated circuit(s) of the hardware. These processor-based emulators sequentially evaluate combinatorial logic levels, starting at the inputs and proceeding to the outputs. Each pass through the entire set of logic levels and instructions is known as a cycle; the evaluation of each individual logic level is known as an emulation step.

Conventional hardware emulators are comprised of identical processors. The processors are generally arranged into groups of processors known as "clusters." In a conventional hardware emulator, each processor performs an identical set of functions, such as retrieving data from a memory, evaluating the data, and writing the processed result back into either the same or different memory. Processors typically address the memory via an instruction word. The instruction word is stored in an instruction memory and contains a read address for the data to be evaluated and a Boolean function table that instructs the processor on how to evaluate the data. The processor then stores the produced result back to the same memory location as indicated by the instruction address Each processor of the processor-based emulation system is typically configured to operate in a lock step mode. During the lock step mode, every processor of the processor-based emulation architecture executes the same instruction number at the same time. In the currently utilized processor-based emulation architecture, a single chip may include thousands of processors, which means that there may be millions of processors, across hundreds of chips, each executing instructions at the same time. The synchronous execution by many, if not all, of the processors of a system and the static scheduling of instructions is not conducive to power regulation, because the system goes from idle (little to no power consumption) to maximum power consumption, in one execution step. Such an event in the system when the power consumption usage of the system goes from idle power to maximum power from one step to the next is called a "load step."

The emulation system generally comprises measures for establishing a power delivery network to components of the system, such as processors. This power delivery network sometimes includes models for a voltage regulator module (VRM) that generates at least one predetermined supply voltage level. When large load steps occur in the emulation systems, for example, when the current goes from a low value to a high value, particularly in high-power applications, the VRM, power distribution conductors, and several different scales of capacitances of the emulation system are not able to compensate, and it becomes difficult to hold a constant voltage. For instance, the capacitance in the emulation chip attempts to hold voltage steady at the scale of frequencies above roughly 300 MHz, but is limited in value depending on how much charge the capacitance can supply. The capacitance on an emulation board reacts slowly because the capacitance effectiveness is limited by the inductance of pathways, which resist changes in the current at high frequencies. Also, there is generally not sufficient capacitance on the emulation chip and the emulation board to supply charge when the circuits of the system architecture go from a very low power to a very high power in a short amount of time. In an emulation system, constant voltage is required for optimal emulation chip function, since most of the switching in the emulation chip is synchronized and the behavior of the transistors cannot be analyzed when the voltage is not held at a pre-determined constant value or at least within a pre-determined range.

Conventional computing systems, such as emulation systems, overcome the voltage fluctuation problem with a VRM configured to regulate the voltage and keep the voltage value at a pre-determined constant value whenever there is a change in the voltage. In operation, the VRM continuously monitors the voltage and subsequently raises or lowers the voltage value to a target set point (or within a target range) when there is any deviation of voltage value from the target set point (or from the target range). For example, if the pre-determined voltage value is set in the emulation system, and the current is increased from a low value to a high value, an IR drop (voltage drop) may occur, which may result in increase or decrease of value of voltage, and thus the voltage may change from the target value. This change in voltage occurs because there is more voltage drop during transmission when more current is being drawn. Also, the voltage at the VRM has to be higher so that the voltage at the emulation chip remains at the pre-determined voltage value.

The IR drop is the voltage reduction that occurs in the power delivery networks in the emulation system. The IR drop may be static or dynamic, and typically results from an existence of non-ideal elements, such as, a resistance within the power and ground supply wiring, and the capacitance between them. There may be an IR drop of a chip package; there may also be a power distribution network inside the emulation chip that may experience some IR drop. The VRM in the system is configured to keep the pre-determined voltage value that has been programmed into the memory, or set by a reference feedback network, etc., of the VRM at a constant value, while taking into consideration the IR drops. In operation, while the current being drawn into the system is increased from a lower value to a higher value, the VRM is compensating the amount of voltage in the system, e.g., pushing out more power to keep the voltage value at a target level regardless of the change of load of the current. In some cases, during the period before the VRM actually adjusts the power, the emulation chip is also not operating, because, in such cases, the emulation chip is designed to function only when the voltage is within a certain range and the voltage at the transistors is below the specified voltage value. In some cases, when the voltage value is out of specification, the transistors do not switch as fast as desired, which may cause timing violations for switching of transistors and/or any number of logical errors.

FIG. 1 is a graphical diagram 100 illustrating the effect on the voltage during a load step in a prior-art emulation system. The graphical diagram 100 shows the voltage at a die of an emulation system, over a timescale where several emulation cycles were run. At a time near a trigger (towards a left-side of the graphical diagram 100), an ASIC goes from an idle state to running a sequence of high-power emulation cycles. As shown in FIG. 1, there is a voltage drop, and subsequently, over a period of time, the VRM adjusts the voltage back to a predetermined value or into a predetermined range. During the intervening period of the voltage drop, the voltage at the transistors is out of the specification, causing the transistors not to switch as quickly as desired. Slowed transistor performance causes timing violations, which, in turn, causes logical errors.

Therefore, there is a need for computing systems to be able to mitigate the load step and provide effective and efficient power management for electrical design emulation.

SUMMARY

Disclosed herein are systems and methods intended to address the shortcomings described above and to provide any number of additional or alternative advantages as well. The systems and methods described herein may continuously consume power, even when execution cycles are not being executed by the circuit components of a computing system. The amount of power consumed mitigates the amount of power-load drop and the amount of power-load rise, when execution cycles end or begin, so that the amount of power consumption does not drop too severely between execution cycles. It should be appreciated that the various exemplary embodiments discussed herein are described as hardware-based emulation systems that implement the improved systems and methods for mitigating the severity of load steps at system startup or at process execution. However, it should also be appreciated that most any computing system may implement variations on such systems and methods for mitigating the severity of load steps at startup or execution, and that these systems and methods are not limited to practice within emulation systems like those mentioned for exemplary purposes below.

In an embodiment, a computer-implemented method comprises generating, by a compiling processor, one or more sets of one or more execution instructions responsive to compiling a netlist file; storing, by the compiling processor, a set of execution instructions into an instruction memory of an execution processor associated with the set of execution instructions; generating, by the compiling processor, a set of one or more keephot instructions for the execution processor based upon the set of execution instructions stored into the instruction memory of the execution processor, wherein the one or more keephot instructions cause the compiling processor to consume power before execution of execution instructions; and storing, by the compiling processor, the set of keephot instructions into the instruction memory of the execution processor.

In another embodiment, a method of circuitry configuration and instruction execution, the method comprising receiving, by an execution processor comprising an instruction memory configured to store one or more instructions, a set of one or more keephot instructions and a set of one or more execution instructions from a compiling processor; executing, by the execution processor, one or more mission instructions from the set of one or more mission instructions stored in the instruction memory; and executing, by the execution processor, one or more keephot instructions from the set of one or more keephot instructions stored in the instruction memory, in response to receiving an instruction to execute the one or more keephot instructions, wherein the execution processor consumes power when executing the one or more keephot instructions, and wherein an output of each respective execution instruction is unaffected by the execution processor executing the one or more keephot instructions.

In another embodiment, a system comprises an instruction memory configured to store one or more types of processor-executed instructions, the instructions including a set of one or more keephot instructions and a set of one or more execution instructions; and an execution processor coupled to the instruction memory and configured to execute one or more execution instructions stored in the instruction memory, and to execute one or more keephot instructions stored in the instruction memory in response to receiving an instruction to execute the one or more keephot instructions, wherein the execution processor consumes power when executing the one or more keephot instructions, and wherein an output of the each respective execution instruction is unaffected by the execution processor executing the one or more keephot instructions.

In another embodiment, a computer-implemented method comprises incrementally executing, by one or more processors of a processor cluster, one or more keephot instructions during one or more keephot cycles of a ramp-up routine; incrementally activating, by a computing system comprising one or more processor clusters containing the processor cluster, a set of one or more processors in each of the one or more processor clusters, wherein each set of one or more processor executes one or more keephot instructions upon receiving an activation signal from the computing system; and upon activating a predetermined number of processor clusters: executing, by one or more processors of the computing system, one or more execution instructions during one or more mission cycles.

In another embodiment, an emulation system comprising a set of processor clusters comprising: an execution processor configured to: execute one or more keephot cycles of a ramp-up routine based on a set of one or more keephot instructions and after the ramp-up routine, execute one or more mission cycles based on a set of one or more execution instructions; and a sequencer configured to: activate one processor cluster from the set of processor clusters at one time based at least in part on the executed one or more keephot cycles and the one or more mission cycles; and divide load step into a number of instances corresponding to a number of processor clusters in the set of processor clusters.

It is to be understood that both the foregoing general description and the following detailed description are exemplary and explanatory and are intended to provide further explanation of the invention as claimed.

BRIEF DESCRIPTION OF THE DRAWINGS

The accompanying drawings constitute a part of this specification and illustrate an embodiment of the invention and together with the specification, explain the invention.

DETAILED DESCRIPTION

Figure 1:
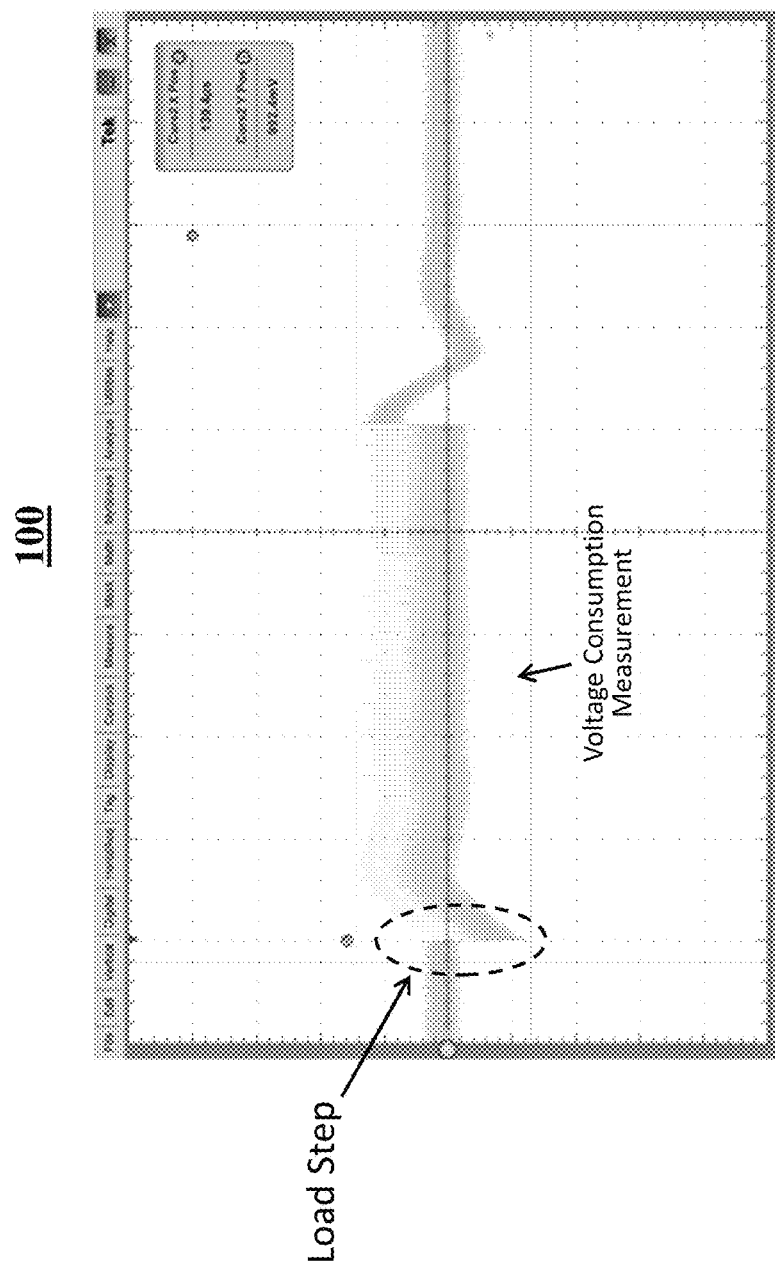
FIG. 1 is a graphical diagram illustrating load step effect in a prior art emulation system.

The present disclosure is here described in detail with reference to embodiments illustrated in the drawings, which form a part here. Other embodiments may be used and/or other changes may be made without departing from the spirit or scope of the present disclosure. The illustrative embodiments described in the detailed description are not meant to be limiting of the subject matter presented here.

Reference will now be made to the exemplary embodiments illustrated in the drawings, and specific language will be used here to describe the same. It will nevertheless be understood that no limitation of the scope of the invention is thereby intended. Alterations and further modifications of the inventive features illustrated here, and additional applications of the principles of the inventions as illustrated here, which would occur to one skilled in the relevant art and having possession of this disclosure, are to be considered within the scope of the invention.

Processor instructions may be generated by a compiler software module and distributed to processors of a computing system. These instructions may instruct the processors to perform particular computations or processes, indicate the particular inputs for executing those instructions, and indicate a destination component of the system (e.g., memory, another processor). In the exemplary embodiments, a compiler software program may generate processor-executable instructions of various types, including mission instructions and keephot instructions, which may be executed during mission cycles and keephot cycles respectively. During mission cycles, sometimes referred to as "execution cycles," the processor may execute mission instructions, sometimes called "execution instructions," associated with the intended mission of the compiled procedure code. During keephot cycles, a processor may execute keephot instructions that, when executed by the processor, cause the processor to consume power in order to mitigate the severity of a load step, but do not have an effect on the computations, inputs, or outputs associated with the intended mission of the compiled procedure code. The components of an exemplary computing system (e.g., chips, processors, instruction stores, compiler) may generate and/or execute keephot cycles that intentionally consume power in order to mitigate load steps. Circuit components, such as processors, may execute any number of mission cycles and/or keephot cycles in order to keep an amount of current drawn by the system roughly constant, thereby avoiding unnecessarily large load steps. In some cases, a load step may be mitigated when a load step occurs in a gap between mission cycles. In such cases, the keephot instructions executed during an intervening keephot cycle, between two mission cycles, allows the power consumption to remain relatively constant, without dropping too severely between the mission cycles. Additionally or alternatively, in some cases, a load step may be mitigated when a load step occurs prior to a first mission cycle, when a compiled procedure is initially executed. By deliberately incrementing the number processors or processor clusters executing keephot cycles, the system may incrementally increase, or "ramp up," the amount of power being consumed, thereby mitigating the severity of the initial load step.

As mentioned above, in some embodiments, a computing system may "ramp up" the amount of power consumed before executing a compiled procedure (e.g., emulating a logic system). Complex integrated circuits, such as chips (e.g., emulation chips), may include any number of processors, which, in some cases, may be organized on a chip into one or more processor clusters, comprising a set of one or more processors. In conventional systems, when a mission or execution cycle (e.g. emulation cycle in an emulation system) is started, the system shifts from an idle state, during which no processors are executing instructions, to a maximum power state, during which all of the processors intended to execute the mission cycles become operational, all in one system step. Unlike conventional systems, processors and/or processor clusters may be configured to be activated one at a time, rather than all at once, allowing the system to "ramp up" the voltage across system cycles. To activate particular processors or processor clusters one or a few at a time, a load step may be divided into a plurality of instances (predetermined load jumps), where the number of instances within the load step corresponds to the number of sets of processor clusters to be activated. For example, a compiler or scheduler software module may determine six processor clusters to execute a compiler emulation procedure, and thus the load step for the system may be divided into six instances. In this example, each of the instances shrink the load step by up to one-sixth of the original size, and as the increment each instance is one-sixth the size of the load step, the severity of the initial load step is mitigated. In operation, after the instructions are downloaded to the instruction memories of each processor, the components of the system are ramped up, by enabling one or more processors or one or more processor clusters at a time, thereby reducing the load step by a factor of the number of processors or processor clusters enabled.

In some embodiments, a computing system may be configured to execute keephot cycles in between mission cycles of a compiled procedure. It is often desirable for computing systems to have a break or gap in the mission cycles of a procedure; this gap in executing mission cycles may be used by components of the system to conduct certain overhead or administrative routines (e.g., flush memories, exchange administrative data bits or instructions). Conventional systems may allow the voltage consumed by the circuit components of the system to drop altogether, below the intended voltage for executing mission cycles. Unlike conventional systems, processors and/or processor clusters may be configured to execute keephot cycles, during which processors may execute a set of keephot instructions causing the processors to continue consuming a roughly constant amount of power, either at the same or different voltage level, but the supposed "outputs" of the keephot instructions have no impact upon the inputs and outputs generated during the mission cycles. A processor may comprise, or may be coupled to, an instruction memory, sometimes referred to as an "instruction store," configured to store the processor's set of instructions in memory addresses, which may be incrementally executed as the system steps through the mission cycles. In some implementations, a subset of the instruction memory addresses within a processor's instruction memory may be reserved to store one or more keephot instructions, which may be executed by the processor during keephot cycles. A keephot cycle consists of executing the keephot instructions, a fixed number of times or a dynamically determined number of times, under the control of one or more system circuits, such as a sequencer circuit that controls the cycles of the system. In operation, whenever a processor is not executing mission cycles, and is not done executing the compiled procedure, the processor may be instructed to execute keephot cycles, thereby continuing to consume power but not continuing to execute the compiled procedure. In some implementations, a timing control interface (TCI) and/or a sequencer circuit may instruct system processors to execute mission cycles and keephot cycles, based on pre-determined logic or triggering conditions and commands from host runtime software.

Figure 2A:
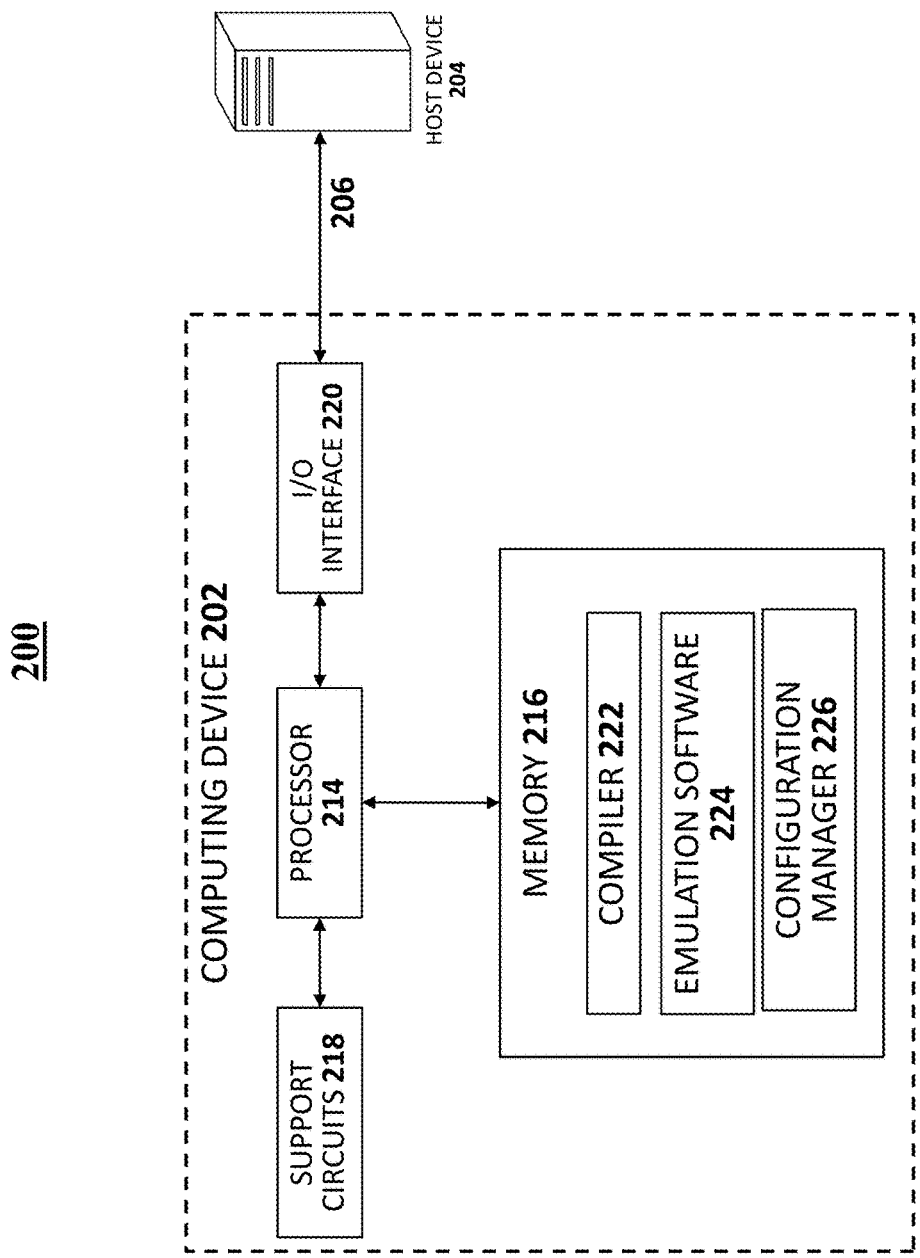
FIG. 2A is a block diagram depicting components of an emulation system, according to an exemplary embodiment.

FIG. 2A is a block diagram depicting components of an emulation system 200, according to an exemplary embodiment. The emulation system 200 includes a computing device 202 coupled to a host device 204 via a communication link 206. The communication link 206 comprises any type of computing networking hardware and software components establishing a bus or link between the devices 202, 204, and allowing for the transfer of data between the computing device 202 and the host device 204. The computing device 202 may be any computing device comprising a processor 214, a memory 216, various support circuits 218, and one or more I/O interfaces 220.

A processor 214 of the computing device 202 may include circuitry configured to execute the various processes and tasks described herein. Non-limiting examples of a processor 214 of the computing device 202 may include, but are not limited to, an x86 processor, an ARM processor, a Reduced Instruction Set Computing (RISC) processor, an Application-Specific Integrated Circuit (ASIC) processor, or a Complex Instruction Set Computing (CISC) processor.

Memory 216 of the computing device 202 may store various forms of software and files, such as an operating system (OS) and emulation support software 224, such as a compiler module 222 and/or a configuration manager 226. Some of the commonly known memory 216 implementations may include, but are not limited to, a random access memory (RAM), a read only memory (ROM), a hard disk drive (HDD), a secure digital (SD) card, a magneto-resistive read/write memory, an optical read/write memory, a cache memory, or a magnetic read/write memory. Support circuits 218 of the computing device 202 may include conventional cache memory, power supply, clock circuits, data registers, I/O interfaces 220, and the like. An I/O interface 220 may be directly coupled to the memory 216 or coupled through the processor 214, and may be configured for communication with the host device 204 via the communication link 206. An I/O interface 220 may also be configured to receive inputs from user interface devices (e.g., keyboard, mouse) and to generate an interactive graphical user interface (GUI) to output on a monitor an interactive display configured to receive user inputs form the various interface devices.

A compiler module 222 may be software configured to convert a hardware design netlist file, e.g., hardware described in a VHSIC hardware description language, to a sequence of instructions that can be evaluated by a hardware emulator executed by a host device 204. The compiler 222 may be executed on any number of devices, such as the computing device 202 or host device 204 shown in FIG. 2A, or another device not shown in FIG. 2A. The compiler module 222 may be a software module component of design or emulation software 224, which may be executed by the computing device 202 or host device 204; or the compiler module 222 may be a standalone software application configured to compile a design file, such as a netlist file. In operation, the compiler module 222 may be configured to receive and compile a netlist design file containing design elements, such as the logic gates, of an integrated circuit currently being designed. The compiler module 222 may then generate a virtual logic file based on the compiled netlist. The compiler 222 "maps" the integrated circuit's logic and timing of operations, according to the design of the integrated circuit, into the hardware components of the emulation system 200, such as processors. The compiler then generates instructions for the components of the emulation system 200 that, when executed by the components of the system 200, cause the emulation system 200 to function as the integrated circuit being designed.

The compiler module 222 may include a partitioner component and a scheduler component, though it should be appreciated that the compiler 222 may be segmented into any number of discrete component software modules. In an opening import phase, the compiler 222 receives a netlist and then begins compiling the netlist. Here, the compiler 222 may parse the logic gates of the netlist into a database format. A partitioner may determine which part of the netlist is going to be executed by which hardware resource of the emulation system 200. Then, a scheduler may determine which of the hardware resources should execute the resulting instructions generated for each particular part of the netlist. The scheduler may also determine when in the execution lifecycle the netlist should be executed.

The emulation software 224 may be a software module, which may be executed by the computing device 202, and is configured to track the status and control the performed of components of the emulation system 200. The emulation software 224 may determine which components of the emulation system 200 are available or unavailable to receive parts of the virtual logic generated by the compiler 222. In some cases, the emulation software 224 continuously polls or self-tests the emulation system 200 for faulty hardware components. In some cases, the emulation software 224 may determine the status of components of the emulation system 200 when the virtual logic is being loaded into the hardware components of the emulation system 200.

A configuration manager 226 may be a component software module of the emulation software 224 executed by the computing device 202 or the host device 204. The configuration manager 226 may be configured to track the status of compiled instructions and may control the execution of instructions by components of the system 200. The configuration manager 226 may determine which components of the system 200 are available or unavailable to receive parts of the virtual logic generated by the compiler 222. In some cases, the configuration manager 226 continuously polls or self-tests the emulation system 200 for faulty hardware components, and may track the availability of various components of the system 200.

In some cases, the various software modules 222, 224, 226 may be executed in whole or in part on a computing device 202, such as an administrator or user computer, configured to communicate data associated with the respective software module to and from the host device 204. For example, in some cases, the computing device 202 may execute a compiler 222 module that allows a user to input a netlist design file, containing logic gate designs of the prototype ASIC, and then compiles the netlist file. The resulting virtual logic generated by the computing device 202 may then be transmitted or otherwise downloaded to a host device 204. In this example, the host device 204 may execute the configuration manager module 226 that tracks the availability of resources within the emulation system 200.

A host device 204 of the emulation system 200 may include an emulation engine configured to be a programmable device used in the verification of hardware design of an integrated circuit currently being designed and tested. The emulation engine may test and verify the operation of an integrated circuit, an entire board of integrated circuits, or an entire system, without having to actually, physically fabricate the hardware. The emulation engine generally comprises an emulation board. The emulation board comprises emulation circuits. The emulation circuit comprises several emulation processors. The emulation processor is capable of mimicking a logic gate. The host device 204 may further comprise any type of emulation platform. For example, the host device 204 may include one or more programmable logic devices (PLDs), such as field programmable gate arrays (FPGAs) to perform the emulation. In one embodiment, the FPGA may be incorporated within or mounted on an expansion board, for example, a personal computer expansion board such as a Peripheral Component Interconnect (PCI) board.

The emulation system 200 may further comprise an instructional database (not shown) and a resource index database (not shown). The instruction database may store records of virtual logic or instruction sets compiled by a compiler from netlist files. The instruction database may be hosted in non-transitory machine-readable storage medium of any computing device capable of hosting the instruction database and performing the various tasks and processes associated with the instruction database, as described herein. The instruction database may receive, from a device executing the compiler, instructions compiled from the netlist file of an integrated circuit being tested. In some cases, the instructions may be contained within a virtual logic file generated by the compiler. At download time, the hardware components of the emulation system 200, such as the instruction memories of processors, are loaded with the compiled instructions.

Figure 2B:
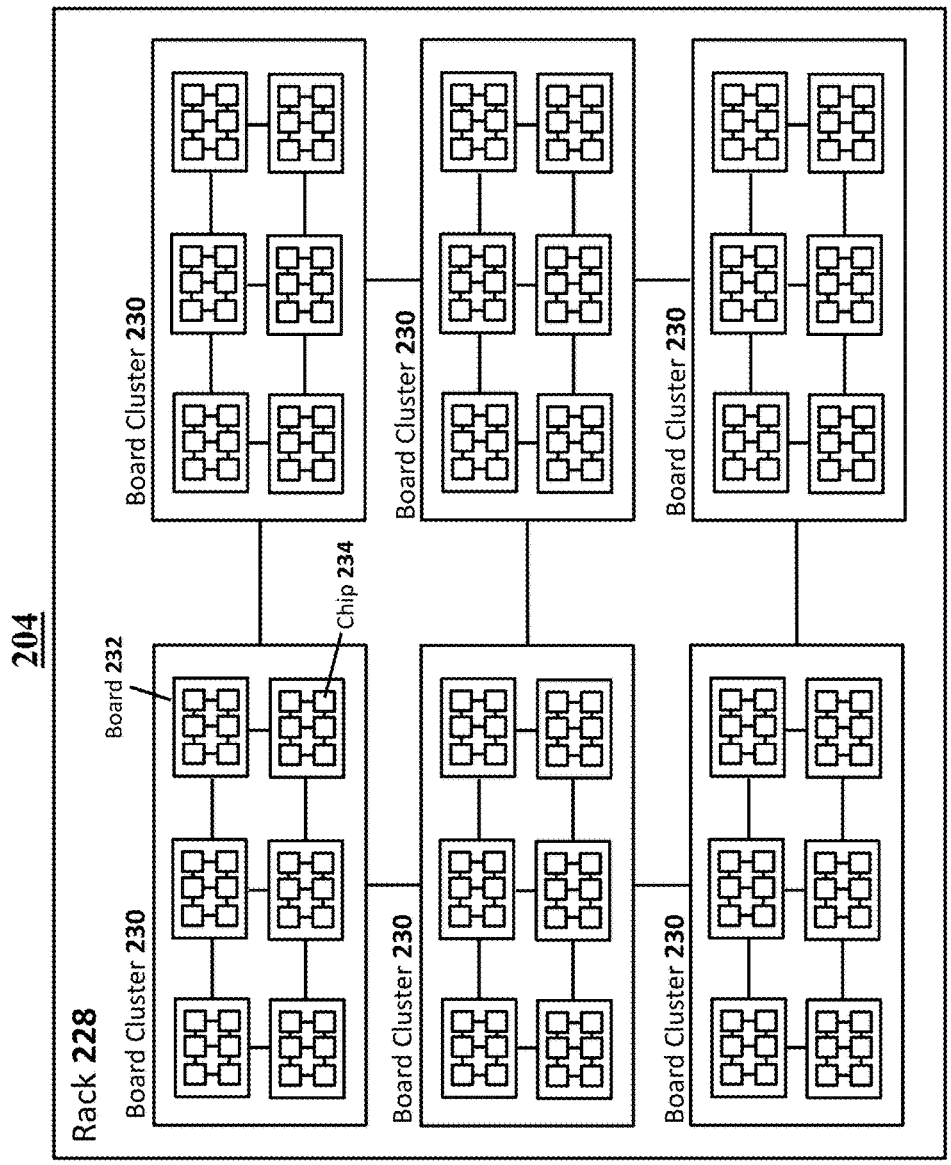
FIG. 2B is a schematic diagram showing a hierarchical configuration of components of an emulation system, which may be housed within one or more host devices, according to an exemplary embodiment.

FIG. 2B is a schematic diagram showing a hierarchical configuration of components an emulation system 200 that may be configured with one or more of the various voltage management components and processes described herein and may be housed within one or more host devices 204, according to an exemplary embodiment. The exemplary emulation system 200 may comprise racks 228 that may physically house components of the emulation system 200, logic board clusters 230, logic boards 232, emulation chips 234, and one or more types of data or signal buses configured to carry data signals between the various components of the emulation system 200. As previously mentioned, although the various systems and methods for managing voltage in computing systems disclosed herein are exemplified in emulation systems 200, it should be appreciated that such systems and methods may be embodied in any number of other computing systems or other type of circuit-driven electrical systems.

Board clusters 230 may be logical and/or physical collectives of one or more logic boards 232. Logic boards 232 may be clustered for any number of reasons, such as creating proximity among a set of boards 232 for more efficient signal transfer and processing between the boards 232 of the cluster 230. It should be appreciated that clustering logic boards 232 is often a design consideration, and, as such, other embodiments may cluster and/or disaggregate logic boards 232 according to any number of different organizational patterns. As shown in FIG. 2B, the exemplary system 200 comprises six board clusters 230; each of the board clusters 230 comprises six logic boards 232. The board clusters 230 may be interconnected with one another by buses, which may carry data signals transmitted to and from the board clusters 230. Likewise, buses may interconnect the logic boards 232 within a particular logic board cluster 230, so that the logic boards 232 may transmit and receive data signals to and from other logic boards 232 within the same logic board cluster 230.

Emulation logic boards 232 comprise computing hardware components capable of emulation functionality to emulate the design and functions of an ASIC or other circuitry; non-limiting examples of emulated ASICs might include CPUs, GPUs, and ALUs, among others. The logic board 232 may comprise one or more emulation chips 234 performing the functions needed for emulation, and one or more buses interconnecting the emulation chips 234. The buses may be an optical, copper, or any other conductive material capable of carrying data signals. In operation, the buses may carry data signals transmitted to and from the emulation chips 234 of the logic board 232. In some cases, the logic board 232 may comprise one or more buses supporting communication between emulation chips 234 on the same logic board 232 (e.g., intra-board communication); and, in some cases, the logic board 232 may comprise one or more buses supporting communication between emulation chips 234 located on other logic boards 232 of the system 200 (e.g., inter-board communication).

Emulation chips 234 may comprise any number of processors capable of performing the various tasks and processes for emulating logic systems (e.g., ASIC, FPGA) being designed; multiplexers configured to direct data signals to and from the processors; buses for communicating data between the processors; and data lanes connecting the components of processors. An emulator chip 234 may be programmatically configured to mimic the functionality of logic systems being designed. The emulator chip 234 may be configured according to programmable logic that configures the emulator chip 234 to mimic the particular behavior of the logic system being tested, based on the logic system's current netlist design. In this way, circuitry designers may prototype new logic system designs using processor-based emulation, before actually manufacturing the logic system. Ion operation, components of the emulation chips 234 may receive sets of instructions from a compiler module 222, which may compile a netlist design file representing the logic system's circuit design. The result of compiling the netlist generates virtual logic comprising the instruction sets for the various components (e.g., processors, multiplexers) of the emulation chips 234.

The emulation chips 234 may further comprise or otherwise be coupled to an emulator controller or an emulator control module (ECM) that controls operations of the emulation chips 234. The ECM may comprise software or firmware instructions configured to supervise the hardware emulation of the components of the system 200, such instructing components of the emulation chips 234 to start and stop an emulation procedure in a synchronized manner, coordinate timestep emulation, monitor the state of the emulation chips 234, among other administrative controls. Thus, the various the emulation chips 234 may be configured to coordinate the emulation of the logic system design.

In some embodiments, the processors of the emulator chip 234 may be organized into any number of processor clusters (not shown) to efficiently share data inputs, data outputs, and data references (e.g., calls to stored data in a data array). For example, multiple processors of an emulator chip 234 may be clustered together such that the processors reference the same data array and/or instruction store. It should be appreciated that, due the modular nature of the components of the system 200, components like the processors may be organized into any number of additional or alternative organizational patterns. In some cases, clusters of processors may be clustered into clusters of clusters. However, it should be appreciated that organizational patterns are not required, and thus, in some embodiments, processors of an emulations chip 234 may not be organized into clusters at all.

Figure 3:
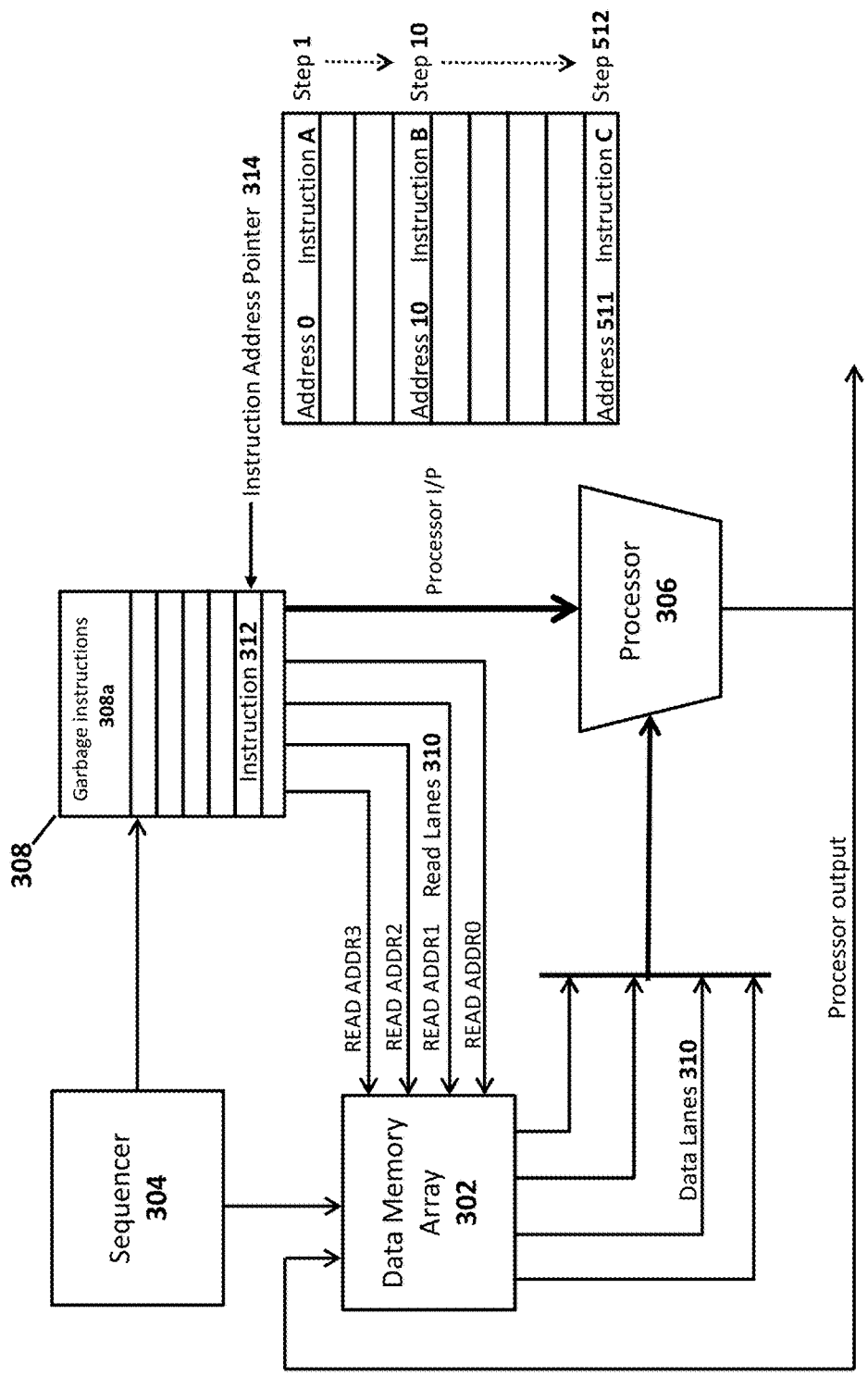
FIG. 3 shows components within an emulation chip of an emulation system, according to an exemplary system embodiment.

FIG. 3 shows components of an emulation chip of an emulation system, according to an exemplary embodiment. Emulation chips disclosed herein are capable of performing programmatic logic functions used for hardware-based (e.g., processor-based) logic system emulation, which may allow for prototyping ASICs, or other forms of circuitry, before actual production of the logic systems. During execution of an emulation procedure, the programmatic logic representing a logic system's behavior and design may be executed by the various processors of emulation chips within the emulation system.

The exemplary emulation chip may comprise a data memory array 302, a sequencer 304, one or more processors 306, an instruction memory 308, and signal lanes 310 connecting the components to one another and to external components of the emulation system. For simplicity, only one emulation processor 306 is shown. However, in some embodiments, several emulation processors 306 may be grouped together into a cluster of processors 306 on the chip to enable the cluster of processors 306 to more efficiently evaluate a large amount of input data in a single emulation step. In such embodiments, a single sequencer 304 and an instruction memory 308 may be coupled to the plurality of the processors 306 or processor clusters. Nearly any number of processors 306 may be used to form a cluster; however, in some cases, the number may be limited by the amount of processing that can occur within a cycle. For simplicity, the following disclosure describes the operation of an emulation system in the context of an emulation chip. However, those skilled in the art will understand that the same concepts apply to an emulation cluster of N-processors or N-processor clusters, where N is an integer greater than or equal to one.

A processor 306 of the emulation chip may be associated with a data memory array 302. In some cases, the data memory array 302 may be a component of the processor 306. In some cases, the data memory array 302 may be communicatively coupled to a plurality of processors 306, such that the data memory array 302 is accessible by a cluster of processors 306. The data memory array 302 is a memory circuit that stores outputs of processors 306 of the emulation chip, as well as data from other external processors. For example, the data memory array 302 may store results generated by the processor 306 after executing an mission instruction during a mission cycle, or the memory array 302 may store inputs from external sources (e.g., external processors of another emulation chip) that will be used by the processor 306 in an upcoming mission cycle.

An instruction memory 308 may be configured to store instructions to be executed by a processor 306. In many cases, the instructions may instruct the processor 306 on which functions should be executed in which system cycle. The instructions may provide inputs for evaluation by the processor 306, or the instructions may indicate which inputs to accept from the data memory array 302 or external sources. The instructions may also indicate the destination for processor 306, such as another processor of the system or a storage location in the data memory array 302. By varying the values received from the data inputs, the processor 306 may emulate any Boolean function requiring two bits. Likewise, the size of the Boolean functions that can be emulated using the LUTs can be increased or decreased by adding or removing the number of select inputs fed into the LUTs. For example, in some embodiments, processors 306 of the emulation chip may comprise LUTs with four inputs (i.e., "LUT4"), which allows each of these processors 306 to perform any four-bit Boolean function. It should be appreciated, however, that there is no limitation upon the number of select inputs that are associated with the LUTs of the emulation chip.

The sequencer 304 is connected to the data memory array 302 and the instruction memory 308. The sequencer 304 provides timing information to the emulation chip. The sequencer 304 is further configured to provide read addresses to the instruction memory 308, and provides sequential write addresses to the data memory array 302. The sequencer 304 is configured to receive a design step (DSTEP) signal, and on receiving the design step (DSTEP) signal, the sequencer 304 starts at an internal counter beginning from an initial value and increments to a maximal value. Each increment of the sequencer 304 causes the step value to advance from zero towards the maximal value and is equivalent to an emulation step. All of the emulation steps form one emulation cycle of the emulation system. The emulation cycle is complete once the sequencer 304 reaches its maximal value. Upon reaching a maximal value, the sequencer 304 begins counting again from its initial value and a new emulation cycle in the emulation system is then initiated.

In the illustrated embodiment, the sequencer 304 is further configured to run and/or execute keephot cycles in addition to the mission cycles. The keephot cycles are executed by the sequencer 304 to perform keephot computations. In one instance, the keephot cycles may be executed by the processor 306 (or processor clusters) to consume power during operation, but not do any useful computations. The keephot cycles may be executed by the sequencer 304 to continuously consume power, even when execution cycles are not being executed so that the amount of power consumed mitigates the amount of power-load drop and power-load rise when execution cycles end or begin in the emulation system.

The emulation system is designed such that the keephot cycles are reserved, and when the sequencer 304 executes the keephot cycles, then the mission cycles are not executed by the sequencer 304. In other words, at a given time, the sequencer 304 either runs the mission cycles configured to result in useful computations when the mission cycles are executed by the processor 306 or run the keephot cycles resulting is non-useful computations when the keephot cycles are executed by the processor 306. In an embodiment, the sequencer 304 may be programmed to selectively run mission cycles or keephot cycles based on an input signal received or any suitable logic programmed into the sequencer 304 to determine a time to run the mission cycles resulting in useful computations when the mission cycles are executed by the processor 306 or the keephot cycles resulting is non-useful computations when the keephot cycles are executed by the processor 306. The mission cycles and the keephot cycles are run by the sequencer 304 such that execution of by the processor 306 of each of the mission cycles and the keephot cycles consumes similar power although the execution of the mission cycles by the processor 306 results in useful computations and the execution of the keephot cycles by the processor 306 results is non-useful computations.

In an embodiment, the sequencer 304 is configured such that once the sequencer 304 initiates a particular sequence of instructions, the particular sequence cannot be stopped. For example, when an emulation cycle is being complied to run for 200 steps, the emulation cycle cannot be run for 150 steps. Similarly, the sequencer 304 is configured to operate for keephot mode. For example, when the sequencer 304 is programmed to run for 50 steps, on initiating a new keephot pulse before the 50 steps are executed, the sequencer 304 will not stop executing. In other words, when the keephot cycle is running, the keephot cycle cannot be stopped and only after the completion of the keephot cycle, next cycle (for example an emulation cycle) may be executed, and so on.

In an embodiment, the memories of the emulation system are refreshed by the sequencer 304. When the mission cycles are being executed, the sequencer 304 sends commands to the memory regarding when to refresh. The memories of the emulation system may require a pre-determined rate of refreshes. Thus, when the emulation cycle is being executed in the emulation system, the sequencer 304 may monitor a length of the emulation cycle and when the emulation cycle reaches a pre-determined level, the sequencer 304 may send commands for the refreshing of the memory, causing a gap in the mission cycles.

As mentioned, a set of instructions may control the operation of a respective processor 306. A single instruction, sometimes referred to as an "instruction word," stored in the instruction memory 308 controls the operation of the processor 306. The sequencer 304 controls operation of the data memory array 302 and processors 306 instruction memory 308 by managing the sequential execution of instruction addresses. In other words, the instruction memory 308 may store instruction words that are sequentially and repetitively provided to their respective processors 306 under the control of the sequencer 304. Each increment of the sequencer 304 causes the system step value to increment by one step, advancing from zero to a predetermined maximum value.

An instruction memory 308 may be a non-transitory machine-readable storage media configured store a set of instructions 312 for the processor to use for performing emulation functions and the associated facilities, including the instructions for the data memory array 302. The instruction memory 308 is coupled to the sequencer 304, the processors, and the data memory array 302. The emulation process begins by writing an emulation program into the instruction memory 308 that will control the processors during emulation when the emulation system runs the emulation program (stepping) and the processors and associated facilities (e.g., data memory array 302) execute the instructions. In some embodiments, the instruction memory 308 may be logically or physically partitioned into a portion that stores mission instructions and a portion that store keephot instructions. During a system step of a mission cycle, the processor 306 may receive mission instructions from a memory address corresponding to the step of the mission cycle. Similarly, during a system step of a keephot cycle, the processor 306 may receive keephot instructions from a memory address corresponding to the step of the keephot cycle. In addition to the instruction words, the instruction memory 308 may also receive read addresses from the sequencer 304 and then provides the corresponding instructions to the processors 306. The instructions are typically generated at compile time and control the operation of the processor 306. The instructions may control or direct the operations of the emulation hardware including the instructions for the data memory array 302 at various system cycles.

In the illustrated embodiment of FIG. 3, a portion 308a of the instruction memory 308 stores instructions for keephot cycles instructing the processor 306 to generate keephot computations that, when generated by the processor 306 during keephot cycles, cause the processors 306 to draw power, but do not affect the computations and outputs when the processors 306 execute mission cycles. Since the sequencer 304 controls the operation of the instruction memory 308 by providing sequential instruction addresses to the instruction memory 308, the instruction memory 308 stores instruction words that are sequentially and repetitively provided to their respective processors 306 under the control of the sequencer 304. In the illustrated embodiment, the instruction memory 308 provides random instructions to their respective processors 306 under the control of the sequencer 304. The instructions may be selected randomly from a total set of instructions that may include mission instructions for generating useful computations executed by the processor 306 and keephot instructions for generating keephot computations executed by the processor 306.

In one example, a plurality of keephot instruction steps may be stored in a reserved portion 308a and may be implemented to generate keephot computation when executed by the processor 306. The portion 308a of the instruction memory 308 may be logically or physically separate from a portion of the memory 308 that stores mission instructions. Here, after compiling the netlist file, the compiler may determine generate keephot instructions from a sample of the mission instructions, and then send the instructions to the respective processors 306 under the control of the sequencer 304 from a total set of instructions (that includes reserved instruction steps) in the instruction memory 308. The execution of one or more of the plurality of keephot instructions by the processor 306 has no consequence on a circuit design being emulated because the plurality of keephot instructions are stored in a different portion 308a of the instruction memory 308 and the result of keephot computations goes into a location in the data memory array 302 at a same position that does not conflict with the outputs generated by the mission cycles.

When a sequencer 304 receives a signal to advance the system to a next system cycle, the sequencer 304 may either run the mission cycles configured to result in useful computations when executed by the processor 306, or run the keephot cycles resulting in non-useful computations when executed by the processor 306. The sequencer 304 may determine to run the mission cycles or keephot cycles depending on the signal received. For instance, on receiving the design step (DSTEP) signal, the sequencer 304 starts at an internal counter beginning from an initial value and increments to a maximal value. Each increment of the sequencer 304 causes the step value to advance from zero towards the maximal value and is equivalent to the emulation step. All of the emulation steps form one emulation cycle which is initiated on receiving the DSTEP signal. In another instance, on receiving keephot step (KSTEP) signal, the sequencer 304 runs the keephot cycles resulting is non-useful computations when executed by the processor 306.

In some embodiments, when either of the mission cycles and/or keephot cycles are initiated by the sequencer 304, the emulation system does not immediately move from idle (no processor working) to maximum power (100% of processors becoming operational). Thus, during this event, the power consumption usage of the emulation system does not goes from idle power to maximum power immediately because there is mitigation in the load of power being consumer by the processors 306. The mitigation in the load of the power being consumer by the processors 306 occurs because all the processors 306 are not activated at the same time. For example, the processors 306 may include a set of processor clusters where each one of the set of processor clusters is configured to be activated one at a time. Due to activation of each of the set of processor cluster one at a time, the load step is divided into a plurality of instances (jumps), where the number of instances corresponds to the number of sets of processor clusters being activated. For example, the load step will be divided into six instances when there are six processor clusters being activated. Thus, each of these instances shrink the load step by up to one sixth of the original size, and as the sequence of all of the instances is very small, and the big load step jump is mitigated.

In an alternate embodiment, an emulation system comprises a plurality of emulation chips. Each of the emulation chips comprises a plurality of processor clusters. In one instance, at a start of any emulation process in the emulation system, the emulation system may be configured in a keephot mode. The keephot mode results in generation of one or more keephot cycles. The generation of keephot cycles results in the sequencer 304 running instructions resulting is non-useful computations when executed by the processors 306.

The sequencer 304 may be configured to provide commands to a set of emulation chips and/or processor clusters from a total number of emulation chips/processor clusters on each of the emulation chip to operate on instructions for keephot cycles being received by the sequencer 304. In this situation, such set of processor clusters when going through a motion of instructions for keephot cycles being run by the sequencer 304, the set of processor clusters operate on the instructions. Since the different processor clusters are not synchronized, therefore the processor cluster may be turned on at any point of time. Also, since the instructions are for keephot cycles and no useful computation is being executed, each processor cluster may be turned on randomly and in no specific order but at a slow speed. In other words, the time at which each processor cluster is activated does not matter.

In some cases, after a pre-determined number of "startup writes" are performed by emulation chips of the emulation system, processor clusters may be turned on and consume full power. A startup write performed by every emulation chip of the emulation system is a write action into sequencer registers by the sequencer 304 to determine to send a pulse to which processor clusters of the emulation chip of the emulation system. Since all the processor clusters are not activated simultaneously (and only after the completion of the pre-determined number of startup writes), the consumption of power in the emulation system is stepped up at a slow pace. This process is sometimes called "ramping up" the consumption of power in the emulation system. When the power consumption has been ramped up, all the processor clusters begins to operate and consume full power. The sequence of instructions being executed by the processor clusters in the emulation chip of the emulation system is a result of the pulse generated by the sequencer 304. Thus, a first step is to send the pulse to the emulation chip, and then the emulation chip is synchronized based on the pulse received by all the emulation chips at the same time. In an embodiment, the pulse is the KSTEP signal.

The ramping of the power consumption is slow enough so that a voltage regulator module (VRM) of an emulation system can compensate. The VRM is configured to hold a constant voltage, causing the voltage to drop as a function of the current in the components of the emulation system. Thus, the ramping of power is done such that the VRM has appropriate time to adjust to the new load before any more ramping up of the power is done. Each step of ramping up of power is set to be longer than a time constant of the VRM. For example, when the power is being ramped up, X amount of time may be idle before the write by the sequencer 304 causes to go to next instruction step. This is so that the VRM is able to adjust to a new load before a next instruction step is performed.

Figure 4:
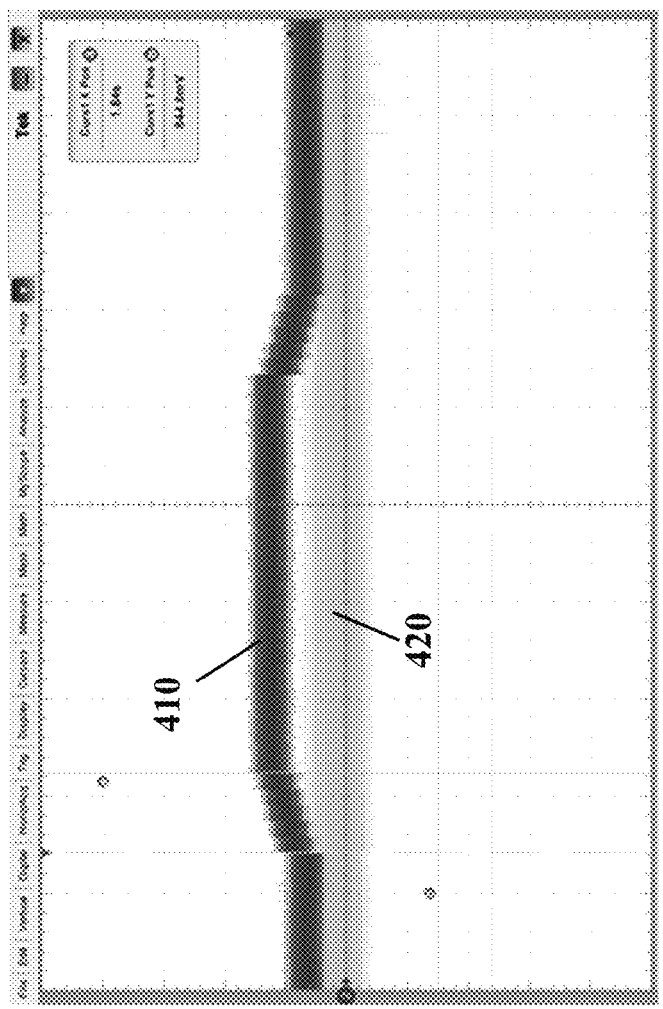
FIG. 4 is a graphical diagram illustrating ramping up of load step effect in an emulation system, according to an exemplary system embodiment.

FIG. 4 is a graphical diagram 400 illustrating ramping up of load step effect in an emulation system, according to an exemplary system embodiment. The graphical diagram 400 shows the effect of the incremental activation of a plurality of processor clusters. In this graphical diagram 400, a line 410 represents voltage at balls of a circuit device, and a line 420 is represents a voltage sensed on the die. The stepping up of the ball voltage occurs due to a trigger on the part of the VRM to compensate for the drop in the sensed voltage when the activity level in the emulation chip is raised. For instance, when the activity in the emulation chip increases, there is increase in the current due to which there is a voltage drop, and the voltage is decreased. At this point, higher amount of current is withdrawn from the VRM until the voltage of the system reaches the target set point.

Referring back to FIG. 3, in an alternative embodiment, a gap (time period) may be there during execution of the mission cycles in the emulation system. The gap may be referred to as period of time before a next cycle is started once a current cycle stops. In one example, a next cycle may not be started until after a break of a pre-determined number of instruction steps (like eight instruction steps). This break time is referred to as a gap. During the gap time-period, less power is consumed by the processor clusters and that may result in spike of voltage during the gap period. Since the gap period is generally in nanoseconds, therefore it is difficult for the VRM to monitor the gap period, and compensate the power during the gap period.

Figure 5:
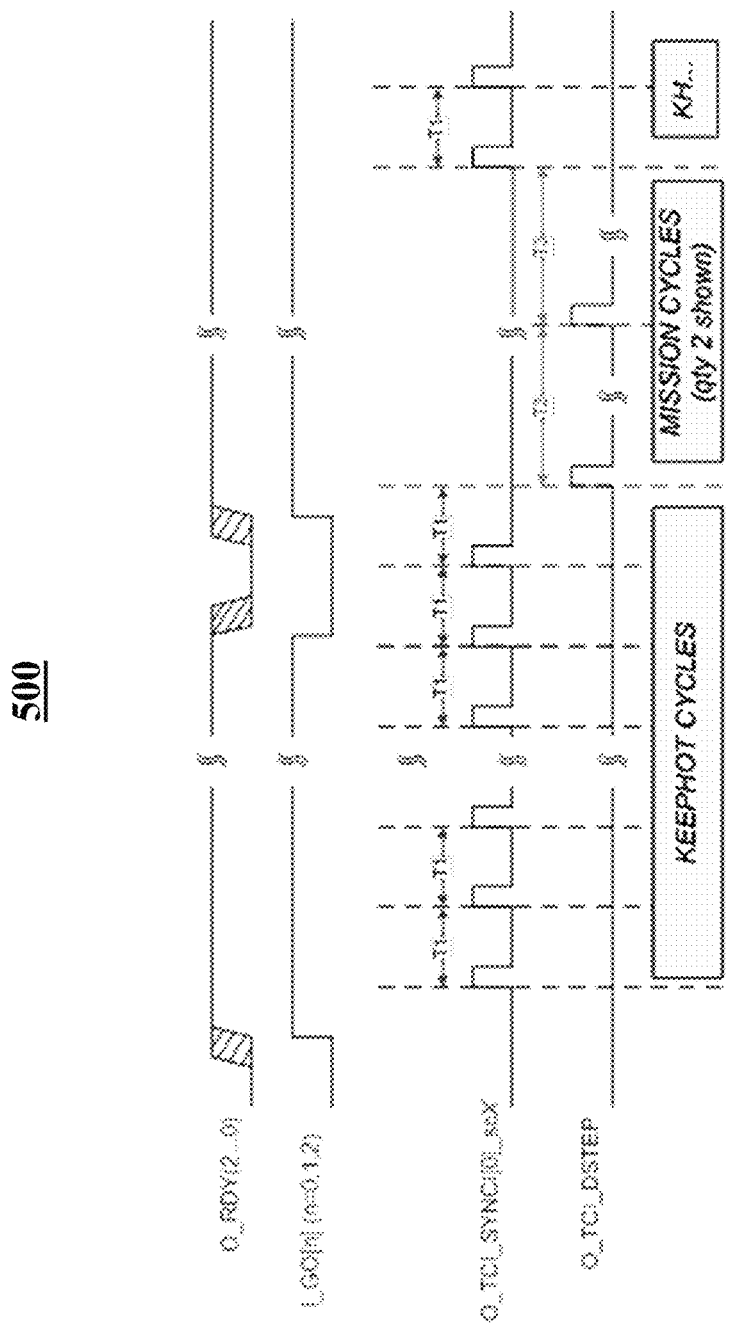
FIG. 5 is a graph illustrating overview of sequence of signals generated by timing control interface (TCI) circuit upon initiation and transition into a set of mission cycles in an emulation system, according to an exemplary system embodiment.

In the emulation system, when mission cycles are run on different emulation chips, all the emulation chips are synchronized. Similarly, when the keephot cycles are run on multiple emulation chips, all the emulation chips are synchronized. In some cases, the synchronization is not critical to running keephot cycles, since the computations being performed are based on keephot instructions. However, when the mission cycles are run on the emulation chips after the keephot cycles, the emulation chips may be synchronized. In order to make sure the gap period is same in duration during execution of the cycles in the emulation system, the gap period is required to end at the same time. For instance, at the beginning when the keephot cycles are started, a pulse is sent to every emulation chip to start the keephot cycles, and this results in each TCI generating their corresponding keephot cycles, and thus the synchronization of the emulation chips occurs across the emulation system. The TCI circuit may be an ASIC, FPGA, or other type of circuit. The TCI is configured to keep the emulation chips synchronized, and generates pulses. A graph illustrating overview of sequence of signals generated by TCI circuit upon initiation and transition into a set of mission cycles in an emulation system is shown in FIG. 5.

Figure 6:
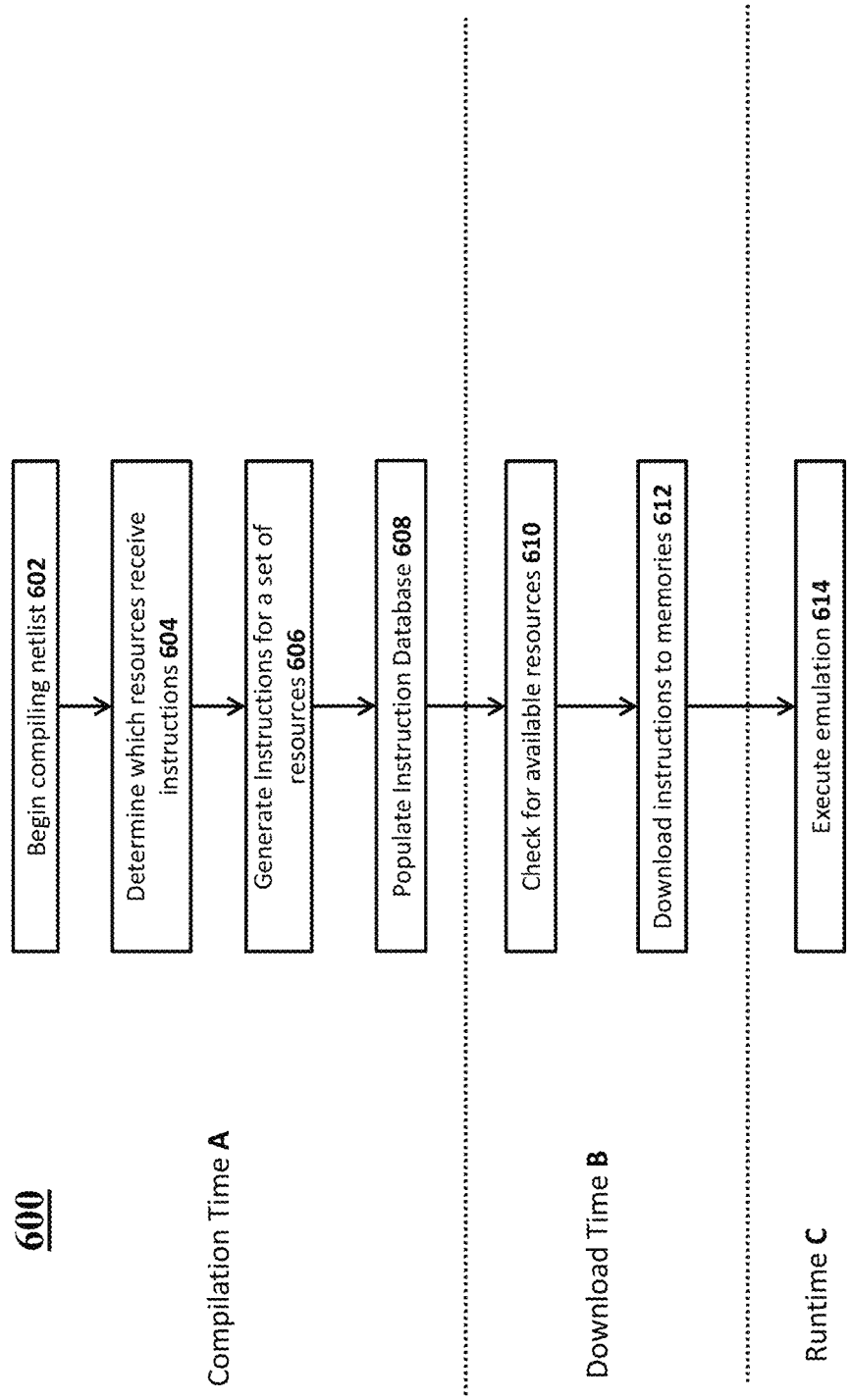
FIG. 6 shows execution of an exemplary method of compiling instructions associated with a set of resources of an emulation system, according to an exemplary embodiment.

FIG. 6 shows execution of an exemplary method 600 of compiling instructions associated with a set of resources of an emulation system, according to an exemplary embodiment. The emulation system may function in a number of stages. In the exemplary method 600, the emulation system is broken into compilation time A, download time B, and runtime C (i.e., execution of the emulation). During compilation time A, a design netlist for a prototype ASIC is compiled into virtual logic comprising a number of instruction sets that are configured for certain resources in the emulation system. At download time B, the system may distribute the instruction sets to the appropriate memories. The emulation system may then execute the emulation during runtime C.

In a first step 602, the emulation system begins compiling a netlist file containing a machine-readable representation of the logic gates in the design of the prototype ASIC. In some cases, this may be an automated process that may be triggered by an event, such as receiving a netlist file uploaded using a graphical user interface (GUI). In some case, compilation may be begin by a user selection, through a GUI, instructing the system to begin compiling the netlist file. In this step 602, a computing device executing a compiler module may compile the netlist file into a machine-readable virtual logic file that, when completed, contains instruction sets or other data for a certain set of resources in the emulation system. Examples of such resources may include processor clusters and target interfaces.

In a next step 604, the compiler determines which resources should receive instructions compiled from the netlist, thereby defining the footprint of resources that will execute the emulation. In some cases, the virtual logic comprises instructions (keephot instructions and mission instructions) that may be distributed to processor clusters of an emulation chip of the emulation system. In such cases, the compiler may identify which operations must be performed by a given processor cluster in a set of processor clusters, and then determine the most efficient location to place each operation. The compiler may determine which processor cluster should receive the instruction for an operation, and then determine which address in the processor clusters instruction memory the instruction should be placed. In some cases, the compiler may comprise software modules capable of determining the availability status for the various components of the emulation system, such as logic boards, logic chips, processor clusters, and data memories, among others.

In a next step 606, after the compiler determines which resources should receive instruction sets, the compiler then generates the instructions of those instruction sets. That is, the compiler may compile the logical gates of the netlist file into instructions for the predetermined resources. The set of resources identified as being available then impacts how the compiler prepares each particular portion of the virtual logic. The netlist file may be compiled into virtual logic with the expectation that the resulting instructions will be executed by the predetermined set of resources. In an embodiment, the compiler module generates one or more sets execution instructions and one or more sets of one or more keephot instructions.

In a next step 608, after generating the instruction sets (one or more sets execution instructions and one or more sets of keephot instructions), the emulation system may populate an instruction database that stores the instructions (one or more sets execution instructions and one or more sets of one or more keephot instruction) and other data of a virtual logic file. The instruction database may store any number of emulation virtual logic files, or individual instruction sets. In some cases, automated or manual processes may instruct the database to distribute the instruction sets to the resources; and in some cases, automated or manual processes may instruct the resources to download or otherwise fetch the instructions.

In an embodiment, the instruction database may include a first portion and a second portion such that the one or more sets of keephot instructions may be stored in the first location in the instruction memory, and the one or more sets of execution instructions in a second location in the instruction memory.

After compilation time A, when the netlist file is compiled into virtual logic containing instructions for resources of the emulation system, the emulation system may then proceed to download time B. Download time B may include manual and/or automated processes associated with distributing compiled instructions to the appropriate instruction memories of a footprint. In some implementations, the emulation system may automatically proceed from compilation time A to download time B; and in some implementations, the emulation system may await a user command or some predetermined triggering event, before proceeding to download time B.

In a next step 610, after the instruction database has been populated, software modules of the emulation system may check the availability of the resources in the footprint before providing the dedicated instruction sets to those resources. In some embodiments, the emulation system may have a configuration manager software module that is executed by a computing device communicatively coupled to the resources of the emulation system. The configuration manager module may be a software module that may be executed during download time B, runtime C, or may always be running for a particular emulator system. The configuration manager monitors the status of resources of the emulation system, such as memories, processors, clusters, lanes, chips, boards, and other components. After compilation time A, but prior to download time B, the configuration manager may determine how to distribute the compiled virtual logic to the resources of the system—regardless of which resources the instruction sets were compiled for—with the goal of each instruction set only being downloaded to a resource that is currently available. In some embodiments, the emulation system may allocate resources for a number ASIC-prototype emulations, so that the emulation system may execute multiple emulations simultaneously. In such embodiments, there are occasions where resources are allocated to another emulation effort, even after the compiler generated an instruction set for those now-allocated resources.

In a next step 612, the emulation system may download the compiled instructions (mission instructions and the keephot instructions) into the memories of the resources that are in the compiled model. In some implementations, the configuration manager or other module may transmit (or push) the respective instructions to appropriate resources. In some implementations, software modules managing the resources may be configured to pull (or fetch) the respective instruction sets.

After download time B, the emulation system may proceed to runtime C. At runtime C, the emulation system enters a state of execution, e.g., when the emulator performs the ASIC emulation.

In a next step 614, the emulation system may execute the instructions (mission instructions and the keephot instructions), according to the compiled footprint. The mission instructions are executed by the emulation system to perform useful computations. The keephot instructions are executed by the emulation system to perform keephot computations. In one instance, the keephot instructions may be executed by the emulation system (or processor clusters) to consume power during operation, but not do any useful computations. In another instance, the keephot instructions may be executed by the emulation system to consume power in order to do computations. The keephot instructions may be executed by the emulation system to continuously consume power, even when mission instructions are not being executed so that the amount of power consumed mitigates the amount of power-load drop and power-load rise when mission cycles end or begin in the emulation system.

The foregoing method descriptions and the process flow diagrams are provided merely as illustrative examples and are not intended to require or imply that the steps of the various embodiments must be performed in the order presented. The steps in the foregoing embodiments may be performed in any order. Words such as "then," "next," etc. are not intended to limit the order of the steps; these words are simply used to guide the reader through the description of the methods. Although process flow diagrams may describe the operations as a sequential process, many of the operations can be performed in parallel or concurrently. In addition, the order of the operations may be re-arranged. A process may correspond to a method, a function, a procedure, a subroutine, a subprogram, etc. When a process corresponds to a function, its termination may correspond to a return of the function to the calling function or the main function.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The actual software code or specialized control hardware used to implement these systems and methods is not limiting of the invention. Thus, the operation and behavior of the systems and methods were described without reference to the specific software code being understood that software and control hardware can be designed to implement the systems and methods based on the description herein.

When implemented in software, the functions may be stored as one or more instructions or code on a non-transitory computer-readable or processor-readable storage medium. The steps of a method or algorithm disclosed herein may be embodied in a processor-executable software module which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used herein, include compact disc (CD), laser disc, optical disc, digital versatile disc (DVD), floppy disk, and blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

While various aspects and embodiments have been disclosed, other aspects and embodiments are contemplated. The various aspects and embodiments disclosed are for purposes of illustration and are not intended to be limiting, with the true scope and spirit being indicated by the following claims.

What is claimed is:

1. A computer-implemented method comprising:
   receiving, by a computing system comprising one or more processor clusters, a set of one or more keephot instructions and a set of one or more execution instructions from a compiling processor;
   incrementally executing, by one or more processors of a processor cluster of the one or more processor clusters, the one or more keephot instructions during one or more keephot cycles of a ramp-up routine, wherein the one or more keephot instructions cause the one or more processors to consume power through non-useful computations;

incrementally activating, by the computing system, a set of one or more processors in each of the one or more processor clusters, wherein each set of one or more processors executes the one or more keephot instructions upon receiving an activation signal from the computing system during the one or more keephot cycles of the ramp-up routine; and upon activating a predetermined number of processor clusters after the ramp-up routine:

executing, by one or more processors of the computing system, the one or more execution instructions during one or more mission cycles.

2. The computer-implemented method according to claim 1, wherein a processor of the one or more processor clusters performs a memory write of data to a memory location during the ramp-up routine.

3. The computer-implemented method according to claim 1, further comprising storing, by the compiling processor, the one or more keephot instructions at a first location in an instruction memory.

4. The computer-implemented method according to claim 3, further comprising storing, by the compiling processor, the one or more execution instructions at a second location in the instruction memory.

5. The computer-implemented method according to claim 3, wherein a sequencer is configured to provide timing to the instruction memory storing the set of one or more keephot instructions and the set of one or more execution instructions.

6. The computer-implemented method according to claim 5, wherein the sequencer is coupled to a processor of the one or more processor clusters.

7. The computer-implemented method according to claim 5, wherein the sequencer is configured to randomly select a keephot instruction from the set of one or more execution instructions for execution by the processor of the one or more processor clusters.

8. The computer-implemented method according to claim 1, wherein one or more timing control interface circuits are configured to generate the one or more keephot cycles and the one or more mission cycles for each emulation chip in an emulation system.

9. The computer-implemented method according to claim 8, wherein the one or more timing control interface circuits are preprogrammed by a sequencer to execute the one or more keephot cycles at a pre-defined period of time.

10. An emulation system comprising:
a set of processor clusters comprising:
an execution processor configured to:
receive a set of one or keephot instructions and a set of one or more execution instructions from a compiling processor;
execute one or more keephot cycles of a ramp-up routine based on the set of one or more keephot instructions and after the ramp-up routine, execute one or more mission cycles based on the set of one or more execution instructions, wherein the set of one or more keephot instructions cause the execution processor to consume power through non-useful computations; and
a sequencer configured to:
activate one processor cluster from the set of processor clusters at one time based at least in part on the executed one or more keephot cycles and the one or more mission cycles; and
divide a load step into a number of instances corresponding to a number of processor clusters in the set of processor clusters.

11. The emulation system according to claim 10, wherein an emulation chip comprises the set of processor clusters.

12. The emulation system according to claim 10, wherein the compiling processor stores the one or more keephot instructions at a first location in an instruction memory.

13. The emulation system according to claim 12, wherein the compiling processor stores the one or more execution instructions at a second location in the instruction memory.

14. The emulation system according to claim 12, wherein the sequencer is configured to provide timing to the instruction memory storing the set of one or more keephot instructions and the set of one or more execution instructions.

15. The emulation system according to claim 14, wherein the sequencer is coupled to the execution processor.

16. The emulation system according to claim 14, wherein the sequencer is configured to randomly select a keephot instruction from the set of one or more execution instructions for execution by the execution processor.

17. The emulation system according to claim 10, further comprising one or more timing control interface circuits configured to generate the one or more keephot cycles and the one or more mission cycles for each emulation chip.

18. The emulation system according to claim 17, wherein the one or more timing control interface circuits are preprogrammed by a sequencer to execute the one or more keephot cycles at a pre-defined period of time.

* * * * *